United States Patent
Smith et al.

(10) Patent No.: US 10,357,812 B2
(45) Date of Patent: *Jul. 23, 2019

(54) METHODS AND APPARATUS TO MONITOR MATERIAL CONDITIONING MACHINES

(71) Applicant: The Bradbury Company, Inc., Moundridge, KS (US)

(72) Inventors: Gregory S. Smith, McPherson, KS (US); Clarence B. Cox, III, McPherson, KS (US)

(73) Assignee: THE BRADBURY COMPANY, INC., Moundridge, KS (US)

( * ) Notice: Subject to any disclaimer, the term of this patent is extended or adjusted under 35 U.S.C. 154(b) by 1082 days.

This patent is subject to a terminal disclaimer.

(21) Appl. No.: 14/703,570

(22) Filed: May 4, 2015

(65) Prior Publication Data

US 2015/0231678 A1 Aug. 20, 2015

Related U.S. Application Data

(63) Continuation of application No. 13/839,809, filed on Mar. 15, 2013, now Pat. No. 9,021,844.

(51) Int. Cl.
*B21D 37/16* (2006.01)
*B21B 37/16* (2006.01)
(Continued)

(52) U.S. Cl.
CPC .............. *B21B 37/16* (2013.01); *B21B 1/24* (2013.01); *B21D 1/02* (2013.01); *B21D 1/05* (2013.01);
(Continued)

(58) Field of Classification Search
CPC ........ G01B 5/20; G01B 11/306; G01B 21/20; B21D 1/02; B21D 39/08; B21D 1/05; B21B 15/00; B21B 37/16; B21B 1/24
(Continued)

(56) References Cited

U.S. PATENT DOCUMENTS

| 3,577,773 A | 5/1971 | Kubo et al. |
| 3,798,450 A | 3/1974 | Reynolds et al. |

(Continued)

FOREIGN PATENT DOCUMENTS

| JP | 60073309 | 4/1985 |
| JP | 61123418 | 6/1986 |

(Continued)

OTHER PUBLICATIONS

European Patent Office, "Extended European Search Report," issued in connection with European Patent Application No. 14 159 949.8, dated Jul. 24, 2014, 7 pages.

(Continued)

*Primary Examiner* — David B Jones
(74) *Attorney, Agent, or Firm* — Hanley, Flight & Zimmerman, LLC

(57) ABSTRACT

Methods and apparatus to monitor conditioning machines are disclosed herein. An example system includes a plurality of work rolls to process a continuous strip of material positioned between an entry and an exit of an apparatus. A sensor is positioned downstream from the exit of the apparatus. The sensor measures a first distance between an upper surface of the strip material and a predetermined reference. The sensor measures a second distance between the upper surface of the strip material and the predetermined reference. The first and second distances is measured at at least one of two different locations or two different instances in time as the strip material exits the apparatus. A controller compares the first distance and the second distance to detect material curvature or longbow in the strip material.

30 Claims, 8 Drawing Sheets

(51) Int. Cl.
  *B21D 1/02* (2006.01)
  *B21D 1/05* (2006.01)
  *G01B 11/30* (2006.01)
  *G01B 21/20* (2006.01)
  *B21B 1/24* (2006.01)
  *G01B 5/20* (2006.01)

(52) U.S. Cl.
  CPC .............. *G01B 5/20* (2013.01); *G01B 11/306* (2013.01); *G01B 21/20* (2013.01)

(58) Field of Classification Search
  USPC .......................................................... 72/249
  See application file for complete search history.

(56) References Cited

U.S. PATENT DOCUMENTS

| | | | |
|---|---|---|---|
| 4,541,723 | A | 9/1985 | Pirlet |
| 5,465,214 | A | 11/1995 | Jeuniaux et al. |
| 5,687,595 | A | 11/1997 | Noe et al. |
| 5,829,286 | A | 11/1998 | Noe et al. |
| 5,953,946 | A | 9/1999 | Mucke et al. |
| 6,029,485 | A | 2/2000 | Bohmer |
| 6,766,278 | B2 | 7/2004 | Liu et al. |
| 6,948,347 | B2 | 9/2005 | Russo et al. |
| 8,375,754 | B2 | 2/2013 | Clark et al. |
| 9,021,844 | B2 | 5/2015 | Smith et al. |
| 2009/0113973 | A1 | 5/2009 | Cox, III |
| 2009/0249849 | A1 | 10/2009 | Martin et al. |
| 2012/0047977 | A1 | 3/2012 | Smith et al. |
| 2014/0260473 | A1 | 9/2014 | Smith et al. |

FOREIGN PATENT DOCUMENTS

| | | |
|---|---|---|
| JP | 06034360 | 2/1994 |
| JP | 11281345 | 10/1999 |

OTHER PUBLICATIONS

Australian Intellectual Property Office, "Patent Examination Report No. 1," issued in connection with Australian Application No. 2014201565, dated Jun. 26, 2014, 4 pages.
Australian Intellectual Property Office, "Notice of Acceptance," issued in connection with Australian Patent Application No. 2014201565, dated Feb. 19, 2015, 3 pages.
Keyence, "IL-065 Sensor Head," [http://www.keyence.com/products/measure/laser-1d/il/models/il-065/index.jsp], retrieved on Aug. 30, 2013, 2 pages.
Keyence, "IL-1000 Amplifier Unit, Din Rail Type," [http://www.keyence.com/products/measure/laser-1d/il/models/il-1000/index.jsp], retrieved on Aug. 30, 2013, 2 pages.
Keyence, "IL-1050 Amplifier Unit, Din Rail Type," [http://www.keyence.com/products/measure/laser-1d/il/models/il-1050/index.jsp], retrieved on Aug. 30, 2013, 2 pages.
United States Patent and Trademark Office, "Non-Final Office Action," issued in connection with U.S. Appl. No. 13/839,809, dated Sep. 23, 2014, 14 pages.
United States Patent and Trademark Office, "Notice of Allowance," issued in connection with U.S. Appl. No. 13/839,809, dated Dec. 26, 2014, 8 pages.
European Patent Office, "Extended European Search Report," issued in connection with European Patent Application No. 17205470.2, dated Jun. 6, 2018, 7 pages.
United States Patent and Trademark Office, "Final Office Action," issued in connection with U.S. Appl. No. 14/703,547, dated Jan. 14, 2019, 11 pages.
State Intellectual Property Office of P.R.C., "Notification of the First Office Action," issued in connection with Chinese Patent Application No. 201711383216.0, dated Jan. 17, 2019, 11 pages.
United States Patent and Trademark Office, "Notice of Allowance and Fee(s) Due," issued in connection with U.S. Appl. No. 14/703,547, dated Mar. 29, 2019, 16 pages.

METHODS AND APPARATUS TO MONITOR MATERIAL CONDITIONING MACHINES

CROSS-REFERENCE TO RELATED APPLICATION

This patent arises from a continuation of U.S. application Ser. No. 13/839,809, (Now U.S. Pat. No. 9,021,844) which was filed on Mar. 15, 2013 and is hereby incorporated herein by reference in its entirety.

FIELD OF THE DISCLOSURE

The present disclosure relates generally to material conditioning machines, and more particularly, to methods and apparatus to monitor material conditioning machines.

BACKGROUND

Material conditioners have long been used in processing strip material used in connection with mass production or manufacturing systems. In a manufacturing system, a strip material (e.g., a metal) is typically removed from a coiled quantity of the strip material. However, uncoiled rolled metal or strip material may have certain undesirable characteristics such as, for example, coil set, longbow, crossbow, etc. due to shape defects and internal residual stresses resulting from the manufacturing process of the strip material and/or storing the strip material in a coiled configuration.

To achieve a desired material condition, a strip material removed from a coil often requires conditioning (e.g., flattening and/or leveling) prior to subsequent processing in a roll forming machine, a stamping machine, a laser cutter and/or other machine(s). For optimum part production, a strip material should have uniform flatness along its cross-section and longitudinal length and be free from any shape defects and any internal residual stresses. Flatteners and/or levelers can substantially flatten a strip material to eliminate shape defects and/or release the internal residual stresses as the strip material is uncoiled from the coil roll.

DETAILED DESCRIPTION

Figure 1:
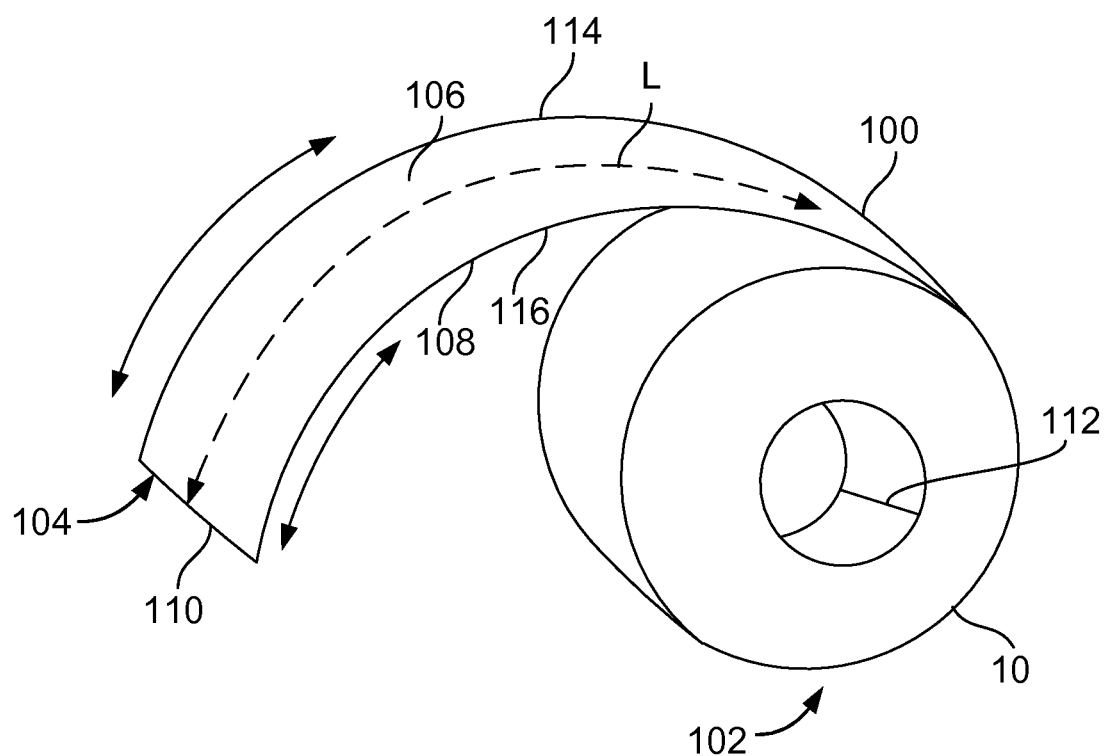
FIG. 1 illustrates an example strip material in a coil condition.

FIG. 1 illustrates a strip material 100 in a coiled state or condition 102. Coiled strip material frequently manifests undesirable material conditions that are the result of longitudinal stretching of the strip material 100 during coiling and/or as a result of remaining in the coiled state 102 for a period of time. In particular, the coil winding process is usually performed under high tension, which may cause a condition commonly referred to as coil set. If significant, coil set may manifest itself as a condition commonly referred to as longbow (e.g., bow up/bow down) causing the strip material 100 to experience curvature (e.g., concavity) along its longitudinal axis. Longbow, for example, is due to a surface-to-surface length differential along a longitudinal length L of the strip material 100 due to the strip material 100 being in the coiled state 102. In other words, the strip material 100 retains curvature (e.g., a curled or curved profile) along the longitudinal length L of the strip material 100. This undesirable condition is manifest in an uncoiled condition or state when the strip material 100 is unwound from a coil or roll 10. For example, due to being in the coiled state 102, an upper surface 106 of the strip material 100 is longer (e.g., bent along the longitudinal length L of the strip material 100) relative to an inner or bottom surface 108 of the strip material 100. As an uncoiled portion 104 is pulled straight, the longer upper surface 106 causes the shorter bottom surface 108 to curl or bend (i.e., longbow).

Undesirable material conditions such as longbow can be substantially eliminated using leveling or flattening techniques. Leveling and/or flattening techniques are implemented based on the manners in which strip materials react to stresses imparted thereon (e.g., the amount of load or force applied to a strip material). For example, the extent to which the structure and characteristics of the strip material 100 change is, in part, dependent on the amount of load, force, or stress applied to the strip material 100.

Levelers typically bend a strip material back and forth through a series of work rolls to reduce internal stresses by permanently changing the memory of the strip material 100. More specifically, the work rolls are positioned or nested to a plunge depth position required to plastically deform the strip material. For example, the plunge depth position can be determined by known material characteristics such as, for example, the thickness of the strip material, yield strength of the strip material, composition of the strip material, and/or work roll diameter, etc.

At the plunge depth position, the work rolls apply a plunge force to plastically deform the strip material 100 as the material enters the leveling machine. Bending the strip material 100 using a relatively low plunge force maintains the strip material 100 in an elastic phase such that residual stresses in the strip material 100 remain unchanged. To substantially reduce or eliminate residual stresses, the strip material 100 is stretched beyond the elastic phase to a plastic phase to stretch the strip material 100 across the entire thickness of the strip material 100. The amount of force required to cause a metal to change from an elastic condition to a plastic condition is commonly known as yield strength. The plunge force applied to the strip material 100 can be increased to transition the material from the elastic phase to the plastic phase to substantially reduce or eliminate the residual stresses of the strip material 100 that cause undesired characteristics or deformations (e.g., such as coil set and/or longbow). Specifically, small increases in the force or load applied to the strip material 100 can cause relatively large amounts of stretching (i.e., deformation) to occur.

Although the yield strength of the strip material 100 is constant, the effect of coil set may require a greater force to bend or stretch the trailing edge 112 of the strip material 100 beyond the yield strength of the strip material compared to a force required to bend or stretch the leading edge 110 of the strip material 100 beyond the yield strength of the strip material 100. However, in some examples, if the strip material 100 is processed with a significant plunge force (e.g., too much plunge force is applied to the strip material 100), the plunge force may cause the upper surface 106 to curl toward the bottom surface 108 (i.e., up bow). Additionally or alternatively, coil set may vary across a width W of the strip material 100 (e.g., between respective peripheral edges 114 and 116).

As a result, nesting the work rolls based only on a plunge depth position may not account for changes in plunge force needed along different portions (e.g., lengths) of the strip material 100 as the strip material 100 uncoils from the roll 10. In other words, different amounts of force (e.g., vertical force) may be needed to condition the strip material 100 (e.g., stretch the strip material beyond its yield strength or prevent over stretching) as the strip material 100 is unwound from the roll 10. For example, an insufficient plunge force provided by a plunge depth position of the work rolls may fail to stretch or elongate a portion of the strip material 100 beyond the yield point of the strip material 100, which may result in relatively minor or negligible permanent change to internal stresses in the unstretched portion of the strip material 100. When a plunge force applied to a portion of the strip material 100 is removed without having stretched portions of the strip material to the plastic phase, the residual stresses remain in those portions of the strip material 100, causing the strip material 100 to return to its shape prior to the force being applied. In such an instance, the strip material 100 has been flexed, but has not been bent. In some examples, the strip material 100 may be overstretched or processed with significant plunge force or depth, causing the upper surface 106 of the strip material to bow downward toward to the bottom surface 108.

The example methods and apparatus disclosed herein monitor for material curvature, concavity or longbow in a strip material and/or provide a substantially flat strip material 100 having minimal or significantly reduced longbow.

To significantly reduce or eliminate longbow from the strip material 100, the example methods and apparatus described herein monitor or measure material curvature (e.g., concavity) to monitor, detect, correct or remove longbow along the longitudinal axis of the length L of the strip material 100. Detection of longbow enables sufficient adjustment of a leveler and/or other flatting machine(s) to apply a sufficient force to a strip material to effectively remove longbow effect (e.g. plastically deform the strip material 100) along an entire length of the strip material 100 (e.g., along the longitudinal length L between the leading and trailing edges 110, 112). More specifically, to detect curvature along the length L of the strip material 100, the example apparatus and methods disclosed herein monitor or detect a difference in measured height values between a reference (e.g., a base of a sensor) and the strip material 100 (e.g., a vertical distance differential) as the strip material exits the levelers. For example, the measured height values may be taken at least at two lateral positions (e.g., horizontal positions) on the strip material 100 as the strip material exits a leveling machine or other flatting machine(s). The measured height values may be taken at least at two lateral positions simultaneously or within a specific time interval (s).

For example, the example methods and apparatus detect a height or distance (e.g., a vertical gap or space) between a reference point and the upper surface 106 of the strip material 100 measured at a first position or point of the strip material 100 and a second position or point (e.g., downstream from the first position) as the strip material 100 exits the leveler machine and travels away from the leveler machine. For example, the first and second positions are spaced apart (e.g., horizontally) at a distance from each other and relative to an exit of the leveler machine. In some examples, the height positions may be measured simultaneously at the first and second positions (i.e., measuring two different lateral points on the strip material 100 at the same time). Additionally or alternatively, in some examples, the same point of the strip material 100 may be measured at different time intervals as the strip material 100 moves between a first position adjacent the exit of the leveler and a second position downstream from the first position (i.e., measuring the same point or location of the strip material 100 as the point or location to be measured moves between a first position and a second position). A difference between the first and second measured height values is determined to monitor for, and/or detect, material curvature. In particular, a difference between the first and second height positions is indicative of longbow being present in the strip material 100. This difference may be either a positive value or a negative value, which indicates the direction and magnitude to detect up bow or down bow.

As a result, the example methods and apparatus disclosed herein enable a leveler or other flatting machine to change a plunge force (e.g., increase or reduce) applied to the strip material 100 sufficient to yield (e.g., plastically deform) the strip material to correct for longbow (e.g., up bow/down bow). When the difference between the measured height values is equal to a threshold or reference value (e.g., a threshold difference around or approximately zero), longbow is substantially removed or corrected, thereby providing significantly improved flatness properties and/or flat laser burning properties in the strip material after leveling.

Figure 2A:
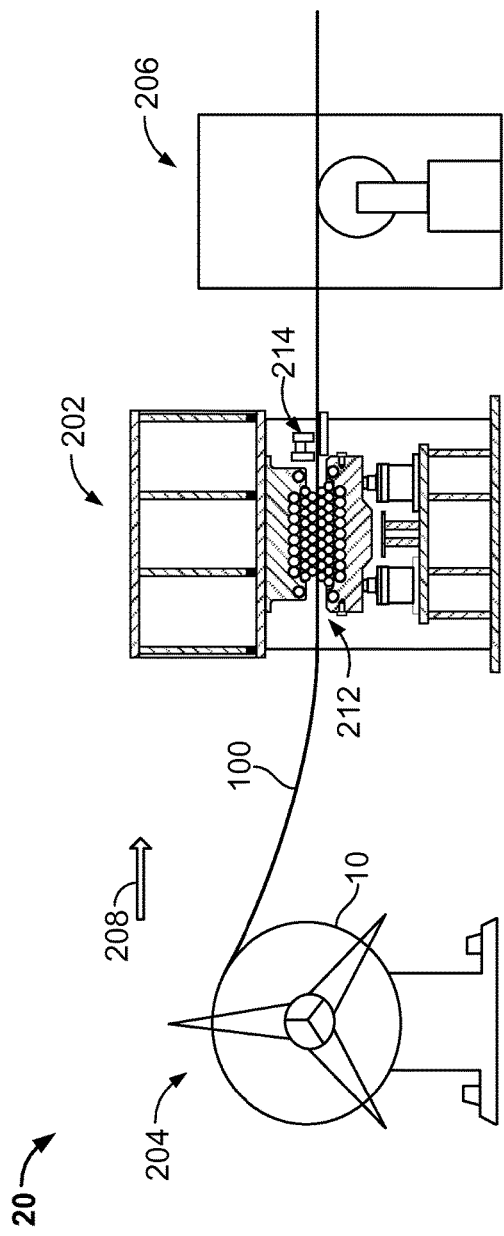
FIG. 2A is a side view of an example production system having an example leveler configured to process a moving strip material constructed in accordance with the teachings disclosed herein.
Figure 2B:
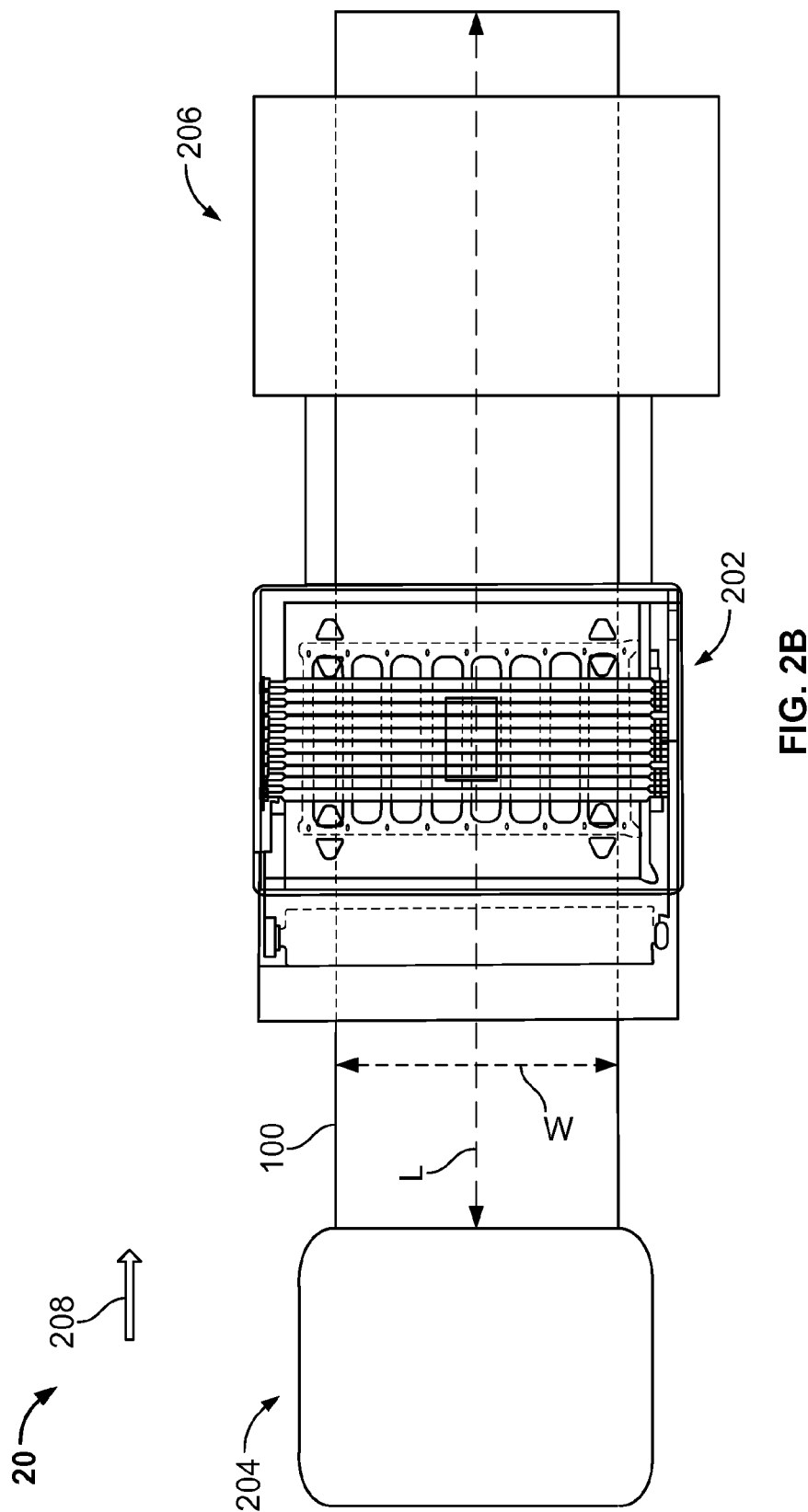
FIG. 2B is a plan view of the example leveler of FIG. 2A.

FIG. 2A is a side view and FIG. 2B is a plan view of an example production system 20 configured to process a moving strip material 100 using an example leveler 202 disclosed herein. In some example implementations, the example production system 20 may be part of a continuously moving strip material manufacturing system, which may include a plurality of subsystems that modify, condition or alter the strip material 100 using processes that, for example, level, flatten, punch, shear, and/or fold the strip material 100. In alternative example implementations, the leveler 202 may be implemented as a standalone system.

In the illustrated example, the example leveler 202 may be placed between an uncoiler 204 and a subsequent operating unit 206. In the illustrated example, the strip material 100 travels from the uncoiler 204, through the leveler 202, and to the subsequent operating unit 206 in a direction generally indicated by arrow 208. The subsequent operating unit 206 may be a continuous material delivery system that transports the strip material 100 from the leveler 202 to a subsequent operating process such as, for example, a punch press, a shear press, a roll former, a laser cutter, etc. For example, during the leveling operation, subsequent operations (e.g., a cutting operation performed by a laser cutter) may be performed as the strip material 100 moves continuously through the leveler 202. In some examples, a conveyor may be employed to transfer and/or support the strip material 100 between the leveler 202 and the subsequent operating unit 206. In other example implementations, sheets precut from, for example, the strip material 100 can be sheet-fed through the leveler 202.

The strip material 100 may be a metallic substance such as, for example, steel or aluminum, or may be any other deformable material. In a coiled state, the strip material 100 may be subject to variable and asymmetrical distribution of residual stresses along its width W (e.g., a lateral axis) and length L (e.g., a longitudinal axis or centerline) that cause shape defects in the strip material 100. As the strip material 100 is uncoiled or removed from the coiled roll 10, it may assume one or more uncoiled conditions or shape defects such as, for example, coil set and/or longbow. Failure to remove the internal stresses of the strip material 100 may cause the uncoiled strip material 100 to curve or bow (e.g., upward) and damage, for example, a laser cutter as the strip material 100 is being cut by the laser cutter.

To condition the strip material 100 and remove internal stresses that may cause uncoilded conditions such as coil set or longbow, the strip material 100 travels through the leveler 202. The leveler 202 of the illustrated example employs a plurality of work rolls 212 to reshape or work the strip material 100 to reduce coil set and/or the internal stresses in the strip material 100 and to impart a flat shape on the strip material 100 as it exits the leveler 202. In this manner, removal of the internal stresses significantly prevents the strip material 100 from, for example, bowing and damaging, for example, a laser cutter as the strip material 100 is being cut by the laser cutter. In other words, the internal memory of the strip material 100 is removed via the leveler 202.

To detect or ensure that material curvature (e.g., longbow or bow) is removed from the strip material 100, the example leveler 202 of the illustrated example employs a bow detection system or apparatus 214 in accordance with the teachings disclosed herein. As described in greater detail below, the bow detection system 214 measures a height difference at one or more points or positions along a length of the strip material 100 (e.g., along a centerline L of FIG. 2B) as the strip material 100 exits the leveler 202.

Figure 3:
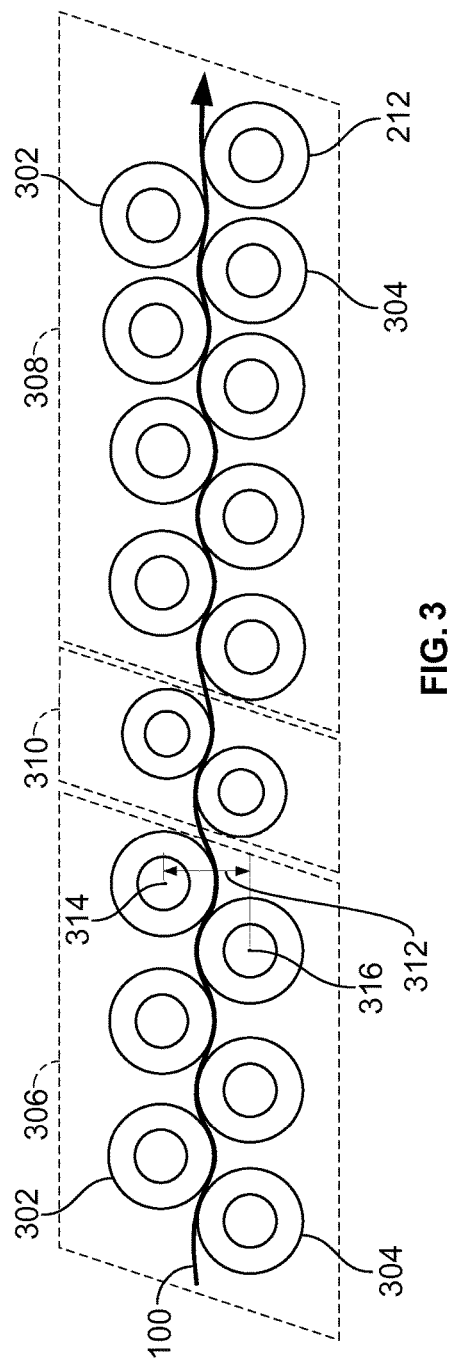
FIG. 3 illustrates an example configuration of work rolls of the example leveler of FIGS. 2A and 2B.

FIG. 3 illustrates an example configuration of the work rolls 212 of the example leveler 202 of FIGS. 2A and 2B. As shown in the illustrated example of FIG. 3, the plurality of work rolls 212 of the leveler 202 are arranged as a plurality of upper work rolls 302 and lower work rolls 304. To reshape or work the strip material 100, the upper work rolls 302 and the lower work rolls 304 are arranged in an offset relationship (e.g., a nested or alternating relationship) relative to one another on opposing sides of the strip material 100 being processed to create a material path that wraps above and below opposing surfaces of the alternating upper and lower work rolls 302 and 304. Engaging opposing surfaces of the strip material 100 using the upper and the lower work rolls 302 and 304 in such an alternating fashion facilitates releasing the residual stresses in the strip material 100 to condition (e.g., flatten, level, etc.) the strip material 100.

In the illustrated example, the upper and lower work rolls 302 and 304 are partitioned into a plurality of entry work rolls 306 and a plurality of exit work rolls 308. The entry work rolls 306 reshape the strip material 100 by reducing the internal stresses of the strip material 100. The exit work rolls 308 adjust any remaining internal stresses of the strip material 100 to impart a flat shape on the strip material 100 as the strip material 100 exits the leveler 202. The leveler 202 of the illustrated example may also employ a plurality of idle work rolls 310 positioned between and in line with the entry work rolls 306 and the exit work rolls 308. For example, the entry and exit work rolls 306 and 308 may be driven via, for example, a motor and the idle work rolls 310 may non-driven, but can be driven in some implementations. In some examples, the entry work rolls 306 may be driven independent of the exit work rolls 308 and the entry work rolls 306 can be controlled independent of the exit work rolls 308. In some examples, the entry work rolls 306 and the exit work rolls 308 may be driven together and/or controlled independently of each other.

The magnitudes of the forces used to condition the strip material 100 depend on the type or amount of reaction the strip material 100 has to being wrapped or bent about a surface of each work roll 212. As shown in FIG. 2, each work roll 212 is used to apply a load (i.e., a plunge force F) to the strip material 100. The plunge force applied by each work roll 212 to the strip material 100 is created by increasing a plunge of the work roll 212 toward the strip material 100. More specifically, to vary the plunge force, a work roll plunge can be varied by changing a center distance or plunge depth 312 between center axes 314 and 316 of the respective upper and lower work rolls 302 and 304. In general, for any given work roll plunge depth or plunge, a decreased distance or increased plunge depth increases the tensile stress imparted to the strip material 100 and, thus, the potential for plastic deformation, which conditions the strip material 100. In the illustrated example, the plunge of the entry work rolls 306 is set to deform the strip material 100 beyond its yield strength and, thus, the plunge of the entry work rolls 306 is relatively greater than a plunge depth of the exit work rolls 308. In some example implementations, the plunge of the exit work rolls 308 can be set so that they do not deform the strip material 100 by any substantial amount but, instead, adjust the shape of the strip material 100 to a flat shape (e.g., the plunge of the exit work rolls 308 is set so that a separation gap between opposing surfaces of the upper and lower work rolls 302 and 304 is substantially equal to the thickness of the strip material 100).

Figure 4:
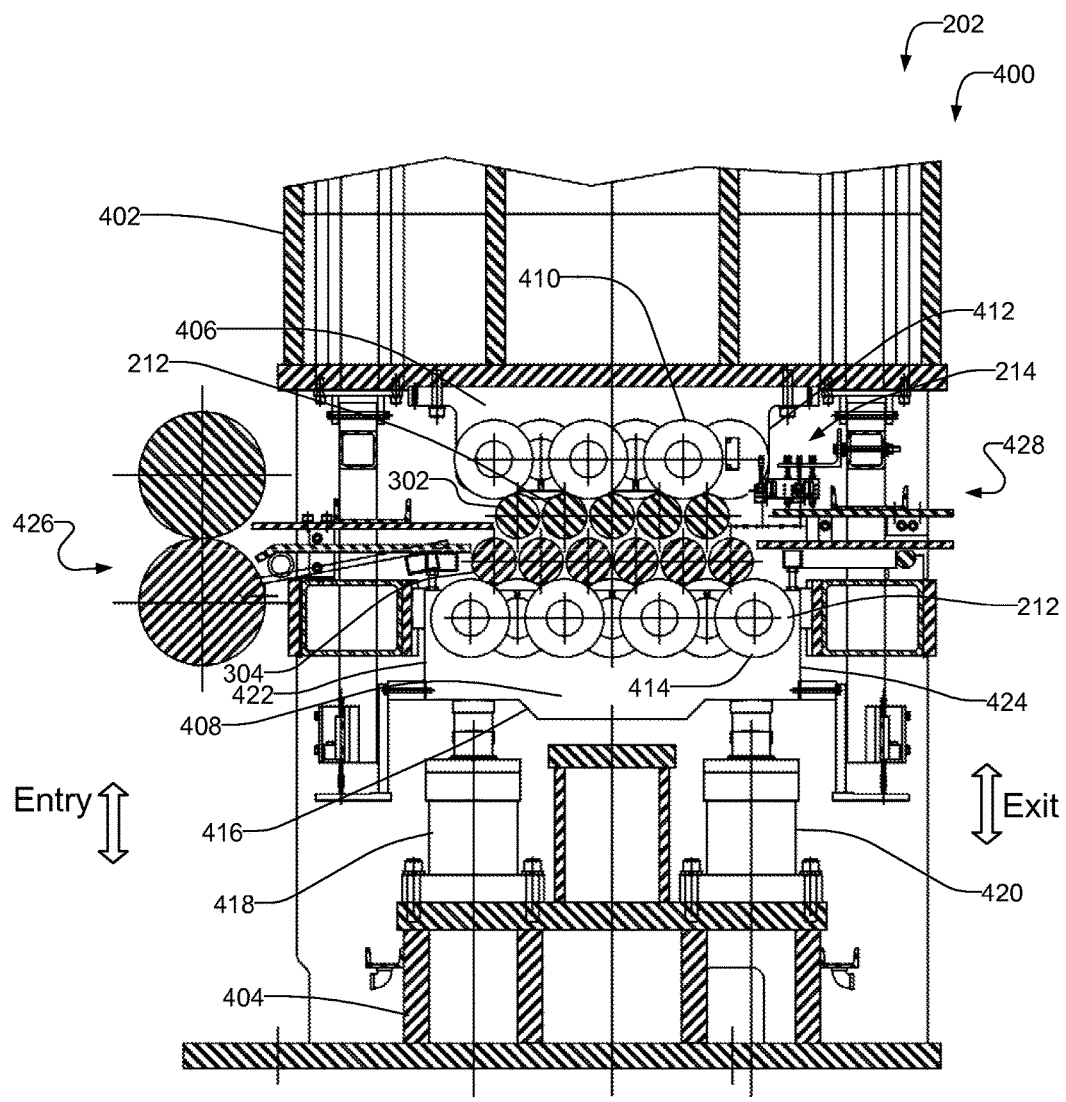
FIG. 4 is a front view of the example leveler of FIGS. 2A, 2B and 3.

FIG. 4 illustrates a side view of the example leveler 202 of FIG. 2. Referring to FIG. 4, the leveler 202 has a frame or housing 400 that includes an upper frame 402 and a bottom frame 404. The upper frame 402 includes an upper backup 406 mounted thereon and the bottom frame 404 includes an adjustable backup 408 mounted thereon. In the illustrated example of FIG. 4, the upper backup 406 is non-adjustable and fixed to the upper frame 402 and the adjustable backup 408 is adjustable relative to the upper backup 406. However, in other example implementations, the upper backup 406 may also be adjustable.

The upper backup 406 includes a row of backup bearings 410 supported by a non-adjustable flight 412 and the plurality of upper work rolls 302 that are supported by the upper backup bearings 410. Thus, the upper backup bearings 410 fix the upper work rolls 302 in place.

The adjustable backup 408 includes a row of lower backup bearings 414 supported by one or more adjustable flights 416. The lower backup bearings 414 support the plurality of lower work rolls 304. In some examples, intermediate rolls (not shown) may be positioned between the upper backup bearings 410 and the upper work rolls 302 and/or between the lower backup bearings 414 and the lower work rolls 304 to substantially reduce or eliminate work roll slippage that might otherwise damage the strip material 100 or mark relatively soft or polished surfaces of the strip material 100. Generally, journals (not shown) rotatably couple the lower and upper work rolls 302 and 304 to the frame 400 to allow rotation of the work rolls 302 and 304. The work rolls 212 are small in diameter and are backed up by the respective backup bearings 410 and 414 to prevent unwanted deflection along the length of the work rolls 212.

In the illustrated example, the leveler 202 uses the adjustable backup 408 (i.e., adjustable flights) to adjust the plunge or a position of the lower work rolls 304 relative to the fixed upper work rolls 302 (e.g., to increase or decrease a plunge depth between the upper and the lower work rolls 302 and 304). Adjustment of the lower work rolls 304 relative to the fixed upper work rolls 302 may enable substantially continuous or stepwise variation of the plunge of the work rolls 212, thereby enabling a substantially continuous or stepwise variation of the stress imparted to the strip material 100.

More specifically, one or more actuators or hydraulic cylinders 418 and 420 move the lower backup bearings 414 via the adjustable flights 416 to increase or decrease a plunge depth between the upper and the lower work rolls 302 and 304. In particular, the lever 202 can change the length of the strip material 100 by adjusting the position of the lower work rolls 304 relative to the upper work rolls 302 via the actuators 418 and 420 to create a longer path. Creating a longer path by increasing a plunge of the upper and lower work rolls 302 and 304 causes the strip material 100 to stretch and elongate further than a shorter path created by decreasing a plunge of the work rolls 302 and 304.

In the illustrated example of FIG. 4, the actuator 418 moves a first end 422 of the adjustable flight 416 relative to a second end 424 of the adjustable flight 416 to adjust a position of the lower work rolls 302 relative to the upper work rolls 304 at an entry 426 of the leveler 202 (e.g., the entry work rolls 306 of FIG. 3). The actuator 420 moves the second end 424 of the adjustable flight 416 relative to the first end 422 to adjust the position of the lower work rolls 304 relative to the upper work rolls 302 at an exit 428 of the leveler 202 (e.g., the exit work rolls 308 of FIG. 3). In this manner, the lower backup bearings 414 supported adjacent the first end 422 of the adjustable flight 416 can be positioned at a first distance or height (e.g., a vertical distance) relative to the fixed upper work rolls 302 adjacent the entry 426 and the lower backup bearings 414 supported adjacent the second end 424 of the adjustable flight 416 can be positioned at a second distance or height (e.g., a vertical distance or a distance different from the first height) relative to the fixed upper work rolls 302 adjacent the exit 428. In other example implementations, the position or plunge of the work rolls 212 can be adjusted by moving the upper backup 406 with respect to the adjustable backup 408 using, for example, motor and screw (e.g., ball screw, jack screw, etc.) configurations. As noted above, to detect material curvature or longbow in the strip material 100, the example leveler 202 of FIG. 204 includes the bow detection system 214. The bow detection system 214 of the illustrated example is positioned at or adjacent the exit 428 of the example leveler 202.

Figure 5:
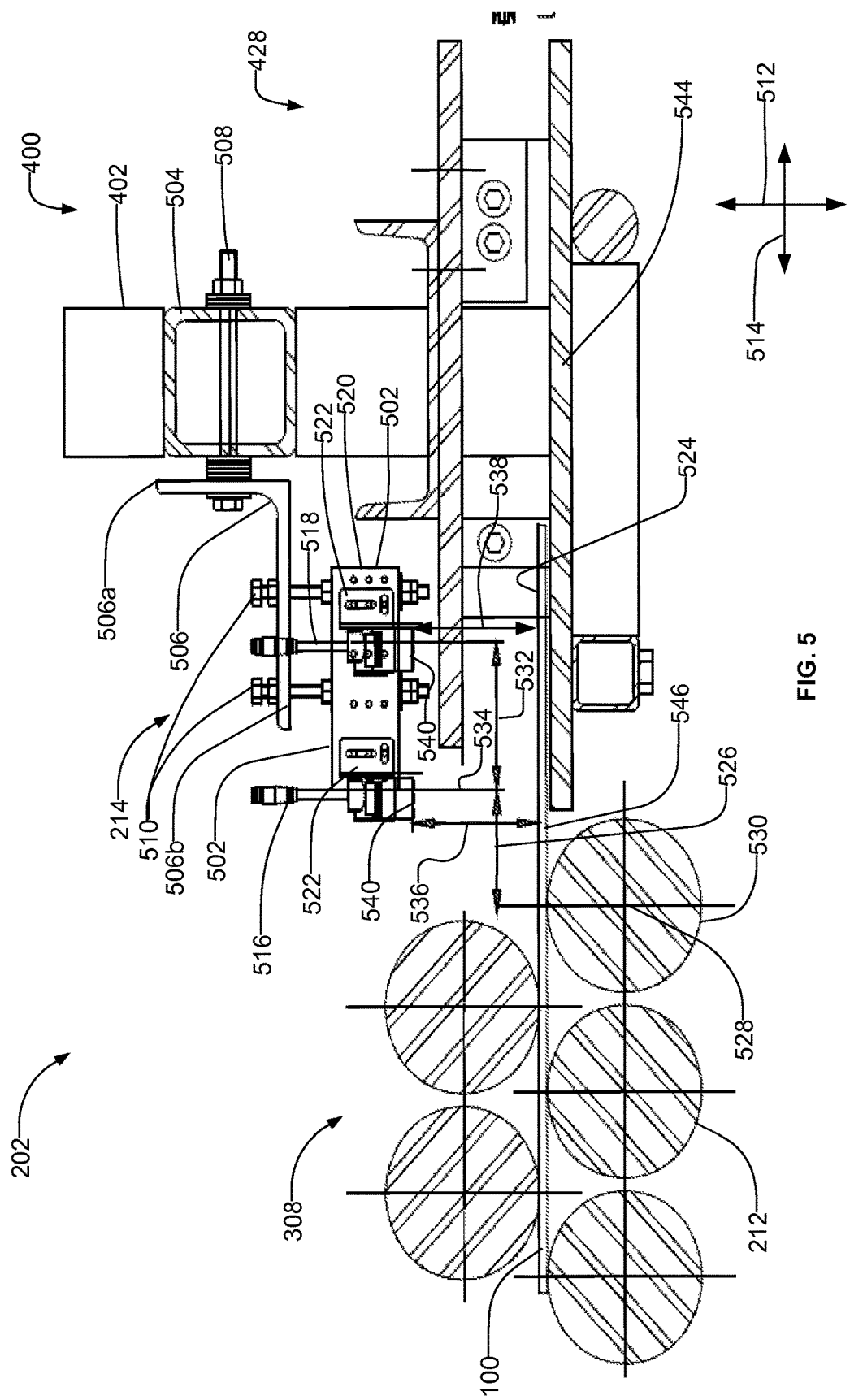
FIG. 5 is an enlarged view of the example leveler of FIGS. 2A, 2B 3 and 4 showing an example bow detection system constructed in accordance with the teachings disclosed herein.

FIG. 5 illustrates an enlarged portion of the exit 428 of the example leveler 202 of FIGS. 2-4. More specifically, FIG. 5 illustrates an enlarged view of the example bow detection system or apparatus 214 of FIGS. 2A, 2B and 4. Referring to FIG. 5, the bow detection system 214 is positioned at or adjacent (e.g., near) the exit 428 of the leveler 202. More specifically, the bow detection system 214 of the illustrated example is positioned within a dimensional envelope or outermost frame of the leveler 202. In this manner, the bow detection system 214 is positioned or mounted inside (e.g., a dimensional envelope of) the leveler 202. Alternatively, the bow detection system 214 may be positioned downstream (e.g., away from the exit 428 or outside a dimensional envelope) of the leveler 202.

The bow detection system 214 of the illustrated example measures or detects material curvature (e.g., concavity, convexity, up bow, down bow, etc.) of the strip material 100 to detect the presence of longbow. To measure or detect material curvature, the example bow detection system 214 of the illustrated example employs a sensor module 502. The sensor module 502 of the illustrated example is coupled or attached to a frame portion 504 of the frame 400. More specifically, the sensor module 502 is supported, coupled or attached to the upper frame 402 of the leveler 202 via a mounting bracket 506. The mounting bracket 506 of the illustrated example is an L-shaped bracket having a first arm 506a coupled to the frame portion 504 and a second arm or portion 506b protruding or cantilevered therefrom to support the sensor module 502. More specifically, the first arm 506a of the mounting bracket 506 is coupled to the upper frame 402 via a fastener 508 and the sensor module 502 of the illustrated example is coupled to the second portion 506b of the bracket 506 via fasteners 510. The fasteners 508, 510 of the illustrated example include washers and/or adjustable screws to enable adjustment of the sensor module 502 in a first direction 512 (e.g., a vertical direction) and a second direction 514 (e.g., a horizontal direction).

The sensor module 502 of the illustrated example includes a first sensor 516 and a second sensor 518. For example, the sensors 516, 518 may be Keyence Model IL-065 sensors manufactured by Keyence America, Inc. In other examples, the sensor module 502 may include only one sensor and/or a plurality of sensors (e.g., more than two sensors).

Each of the first and second sensors 516, 518 of the illustrated example is coupled or supported by a housing 520 of the sensor module 502. Additionally or alternatively, each of the first and second sensors 516, 518 of the illustrated example is movably coupled to the housing 520 via a slider 522. More specifically, each slider 522 of the illustrated example enables independent adjustment of the first and second sensors 516, 518 relative to the housing 520, the strip material 100 and/or relative to each other, in both the first direction 512 (e.g., up and down in a vertical direction) and the second direction 514 (e.g., side to side in a horizontal direction). Thus, the sensor module 502 of the illustrated example enables adjustment of the first and second sensors 516, 518 relative to (e.g., toward and away from) an upper surface 524 of the strip material 100. Additionally, the sensor module 502 or the slider 522 of the illustrated example also enables adjustment (e.g., left and right or side to side adjustment) of the first and second sensors 516, 518 relative to each other and/or the exit 428 of the leveler 202 in the second direction 514 (e.g., in the horizontal direction). Each slider 522 of the illustrated example may be configured to enable manual adjustment of the sensors 516, 518 (e.g., via fasteners) and/or automated adjustment of the sensors 516, 518 (e.g., via stepper motors) in the first and second directions 512, 514.

As shown in the illustrated example, the first sensor 516 is positioned at a first distance or position 526 (e.g., a horizontal distance) from a center axis 528 of a work roll 530 of the plurality of work rolls 212. In this example, the work roll 530 is one of the plurality of exit work rolls 308 and is the closest work roll to the exit 428 of the leveler 202. The second sensor 518 of the illustrated example is positioned at a second distance or position 532 (e.g., a horizontal distance) from the first sensor 516 and/or the center axis 528 of the work roll 530. For example, the first distance 526 may be between approximately two inches and four inches from the center axis 528 of the work roll 530 and the second distance 532 may be between approximately two and a half and six inches from an axis 534 (e.g., a vertical axis) of the first sensor 516.

In the illustrated example, the first sensor 516 is also spaced at a third distance 536 (e.g., a vertical distance) from the upper surface 524 of the strip material 100 and the second sensor 518 is positioned at a fourth distance 538 (e.g., a vertical distance) from the upper surface 524 of the strip material 100. As shown in FIG. 5, the distances 536, 538 are substantially equal or identical. For example, the first and second sensors 516, 518 may be positioned at a distance of between approximately two inches and four inches away from the upper surface 524 of the strip material 100. Alternatively, in other examples, the distance 536 may be different from the distance 538.

Additionally or alternatively, the sensors 516, 518 of the bow detection system 214 of the illustrated example are positioned or aligned relative to the longitudinal axis L (FIG. 2B) of the strip material 100. In other words, the sensor module 502 and/or the sensors 516, 518 are centered between peripheral edges 114, 116 of the strip material 100. However, in other examples, the sensors 516, 518 may be offset relative to the longitudinal axis L (FIG. 2B) of the strip material 100. In some examples, one of the sensors 516, 518 may be offset from the longitudinal axis L and the other one of the sensors 516, 518 may be aligned with the longitudinal axis L of the strip material 100. In some examples, the first sensor 516 may be offset relative to a first side of the longitudinal axis L (e.g., toward the peripheral edge 114 of the strip material 100) and the second sensor 518 may be offset to a second side of the longitudinal axis L (e.g., toward the peripheral edge 116 of the strip material 100).

As described in detail below, each of the sensors 516, 518 is calibrated. Each sensor 516, 518 is calibrated with a reference value because each of the sensors 516, 518 can be positioned at different heights or offsets relative to the upper surface 524 of the strip material 100. For example, the sensors 516, 518 are calibrated such that each base 540 of the respective sensors 516, 518 provides a reference for measuring a height or vertical distance between the upper surface 524 of the strip material 100 and the base 540 of each of the sensors 516, 518. Thus, the base 540 of the first sensor 516 may be at a first height or distance relative to the upper surface 524 of the strip material 100 and the base 540 of the second sensor 518 may be at a second height or distance relative to the upper surface 524. To provide the reference point or position 540 for each of the respective sensors 516, 518, the first and second sensors 516, 518 of the illustrated example are each calibrated (e.g. independently of each other) to provide an initial value or reference (e.g., a reference value or a distance corresponding to the distances 516, 516) indicative of the strip material 100 having a desired flatness characteristic.

In some examples, the reference points or positions of the sensors 516, 518 are calibrated manually based on operator verification. For example, the leveler 202 is adjusted to a particular plunge depth based on the characteristics of the strip material 100. A leveled portion of the strip material 100 is sheared and inspected (e.g., visually inspected) for the presence of longbow (e.g., up bow/down bow). When longbow is not present in the test material (i.e., when the portion of the sheared strip material 100 is substantially flat and substantially free of up bow or down bow), the positions (e.g., the vertical positions) of the sensors 516, 518 are measured, indicated or recorded as the predetermined or calibrated reference values (e.g., threshold values, distances corresponding to the distances 536, 538) for the respective sensors 516, 518. For example, the calibrated or reference values of the respective distances 536, 538 associated with the sensors 516, 518 are indicated or recorded as reference positions or heights (e.g., reference values) between the base 540 of the respective sensors 516, 518 and the upper surface 524 of the strip material 100 during calibration. In turn, during operation, the distance 536 between the base 540 of the first sensor 516 and the upper surface 524 is measured based on the previously determined or calibrated reference value (e.g., the calibrated distance value) of the first sensor 516 and the distance 538 between the base 540 of the second sensor 518 and the upper surface 524 is measured based on the previously determined or calibrated reference value (e.g., the calibrated distance value) of the second sensor 518. Thus, during operation, each of the sensors 516, 518 provides a signal representative of a measured distance between the base 540 of the respective sensors 516, 518 and the upper surface 524 of the strip material 100 based on their respective calibrated or predetermined reference values. Changes in the distances measured by the sensors 516, 518 compared to the threshold value (e.g., a near zero value) is indicative of longbow.

Alternatively, calibration plates having a known thickness may be positioned between the upper and lower work rolls 302 and 304. For example, an operator may position the calibration plates between the upper and lower work rolls 302 and 304 prior to each production run. With the calibration plates positioned between the upper and lower work rolls 302, 304, the lower work rolls 304 are moved toward the upper work rolls 302 until the upper and lower work rolls 302 and 304 engage or close against opposing surfaces of the calibration plates. With the calibration plates in position, the measured height values of the respective distances 536, 538 are measured between the base 540 of the respective sensors 516, 518 and the calibration plates to define the predetermined or calibrated reference value for each of the sensors 516, 518 (e.g., a calibrated reference value).

With the reference point being measured or determined (e.g., when the first and second sensors 516, 518 are calibrated), the bow detection system 214 of the illustrated example measures the height or distance 536 between the base 540 of the first sensor 516 and the upper surface 524 of the strip material 100 and the height or distance 538 between the base 540 of the sensor 518 and the upper surface 524 of the strip material 100. The measured height values are based on the predetermined calibrated reference values of the respective sensors 516, 518. The bow detection system 214 of the illustrated example then calculates a difference between the measured values representative of the distances 536, 538 to detect material curvature or longbow. The calculated difference is compared to the threshold value (e.g., a near zero value). If a magnitude of the calculated difference of height values of the respective distances 536, 538 exceeds the threshold, then the calculated difference is indicative of longbow. Further, a negative or positive value of the calculated difference is indicative of down bow or up bow (e.g., the direction of the longbow).

In other words, to detect material curvature or longbow, the example bow detection system 214 of the illustrated example monitors or detects a difference (e.g., a vertical distance differential) between the distance or height 536 (e.g., based on the calibrated reference value) at a first position on the strip material 100 associated with the first sensor 516, and a distance or height 538 (e.g., based on the calibrated or reference value) at a second position on the strip material 100 associated with the second sensor 518. In some examples, the example bow detection system 214 of the illustrated example measures a difference between the upper surface 524 of the strip material 100 and each base 540 simultaneously along more than two different locations (e.g., two horizontal positions) associated with the sensors 516, 518 on the strip material 100 as the strip material 100 exits the leveler 202.

Alternatively, a first height value measured by the first sensor 516 may be compared with a second height value measured by the first sensor 516 as the strip material 100 moves along the production system 20. Likewise, a first height value measured by the second sensor 518 may be compared to a second height value measured by the second sensor 518 as the strip material 100 moves along the production system 20. In other words, in some such examples, the sensor module 502 may employ only one sensor to detect material curvature or longbow.

The bow detection system 214 of the illustrated example includes a plate, conveyor, and/or platform 544 that receives or supports the strip material 100 as the strip material 100 exits the work rolls 212. More specifically, the strip material 100 is supported on the conveyor 544 to prevent or reduce deflection of the strip material 100 in a downward direction as the strip material 100 exits the leveler 202 and moves across the sensors 516, 518 in the second direction 514. In this manner, the sensors 516, 518 can read or detect more accurately the measured height values representative of the distances 536, 538 between the base 540 and the upper surface 524 of the strip material 100, thereby resulting in a more accurate detection of material curvature or longbow.

In operation, a differential between the measured height values of the respective distances 536, 538 associated with the respective sensors 516, 518 is indicative of the presence of material curvature or longbow in the strip material 100. For example, a difference between the measured values representative of the distances 536, 538 that is less than (e.g., has a negative value) zero is indicative of up bow and a measured difference between the measured values representative of the distances 536, 538 that is greater than (e.g., has a positive value) zero is indicative of down bow. Therefore, the sensor module 502 also provides an indication of the direction and/or magnitude of stresses present in the strip material 100 that may result in longbow.

As a result, the example methods and apparatus disclosed herein enable the leveler 202 (or other flatting machine) to change or adjust (e.g., increase or reduce) a plunge force applied to the strip material 100 sufficient to yield (e.g., plastically deform) the strip material 100 to correct for longbow (e.g., up bow/down bow). When the measured difference between the distances 536, 538 associated with the sensor 516, 518 is substantially zero, longbow or material curvature is substantially removed and the strip material 100 is conditioned to have a substantially flat characteristic. Removal of material curvature significantly reduces stress in the strip material 100 to provide significantly improved flatness properties and/or flat laser burning properties in the strip material 100 after leveling.

However, when the sensor module 502 detects that longbow is present (e.g., a difference between the measured height values associated with the distances 536, 538), the example leveler 202 of the illustrated example may provide an indication to an operator to adjust (e.g., either reduce or increase) the plunge depth of the of the work rolls 212. Additionally or alternatively, the example leveler 202 may automatically adjust the plunge position or depth of the work rolls 212 based on the strip material 100 characteristics and the detected or measured height differential value. For example, a difference between the measured values representative of the respective distances 536, 538 associated with the first and second sensors 516, 518 of approximately 0.005 inches may require a plunge adjustment of approximately 0.001 inches to remove or correct material curvature or longbow in the strip material 100. Further, depending on the differential being a negative or positive value, the leveler 202 may be adjusted to increase or decrease the plunge depth by approximately 0.001 inches. In some examples, if the difference is greater than a threshold value (e.g., a maximum difference value), the example leveler 202 or production system 20 may generate an alarm and/or automatically stop a production run.

Figure 6:
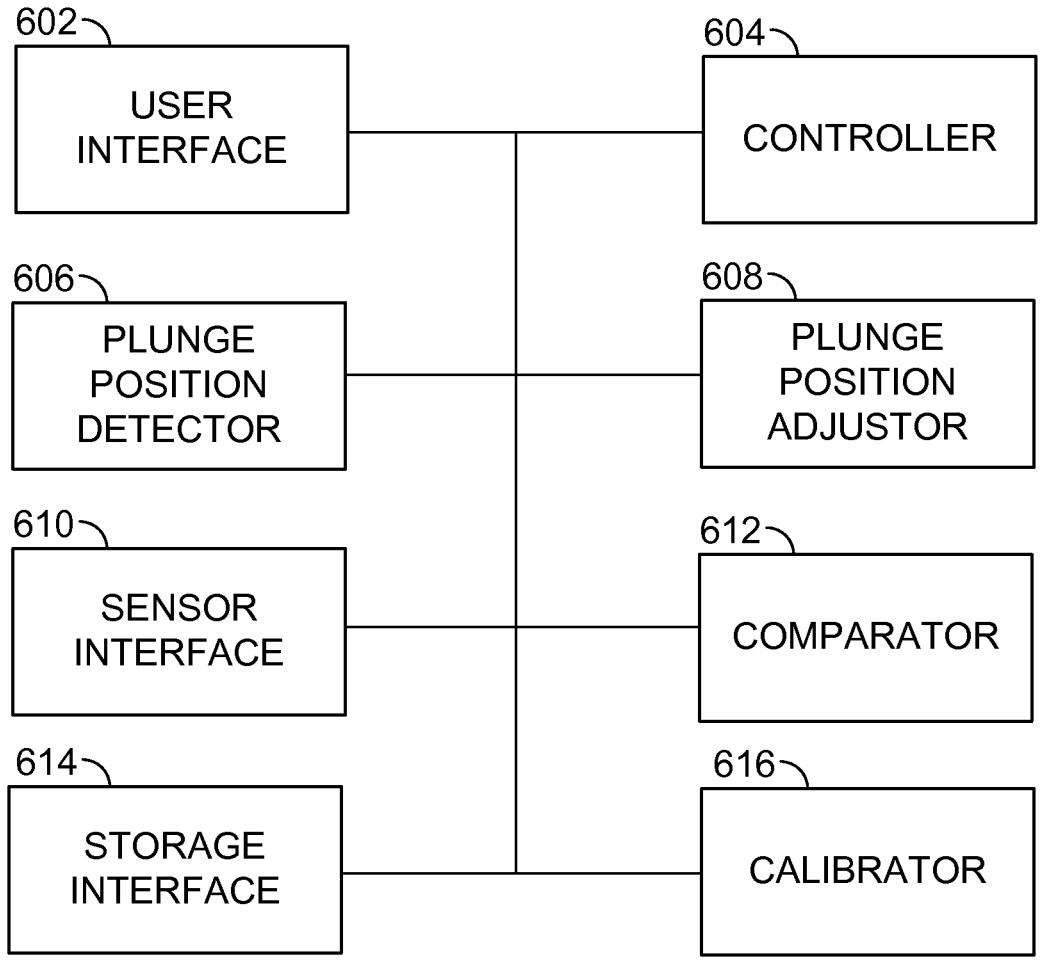
FIG. 6 illustrates an example system that may be used to operate the example leveler of FIGS. 2A, 2B, 3-5.

FIG. 6 is a block diagram of an example system or apparatus 600 for automatically monitoring and conditioning the strip material 100. In particular, the example apparatus 600 may be used in connection with and/or may be used to implement the example leveler 202 of FIGS. 2A, 2B and 3-5 or portions thereof to adjust a plunge depth of the work rolls 212 based on a measured difference detected or provided by the sensor module 502. The example apparatus 600 may also be used to implement a feedback process to adjust a plunge depth of the entry and/or exit work rolls 306 and 308 (FIG. 3) to condition the strip material 100 based on the measured height difference provided by the sensor module 502.

The example system 600 may be implemented using any desired combination of hardware, firmware, and/or software (e.g., a PLC). For example, one or more integrated circuits, discrete semiconductor components, and/or passive electronic components may be used. Additionally or alternatively, some or all of the blocks of the example system 600, or parts thereof, may be implemented using instructions, code, and/or other software and/or firmware, etc. stored on a machine accessible medium that, when executed by, for example, a processor system (e.g., the processor platform 810 of FIG. 8) perform the operations represented in the flowchart of FIG. 7. Although the example system 600 is described as having one of each block described below, the example system 600 may be provided with two or more of any block described below. In addition, some blocks may be disabled, omitted, or combined with other blocks.

As shown in FIG. 6, the example system 600 includes a user interface 602, a controller 604, a plunge position detector 606, a plunge depth or position adjustor 608, a sensor module interface 610, a comparator 612, a storage interface 614, and a calibrator interface 616, all of which may be communicatively coupled as shown or in any other suitable manner.

The user interface 602 may be configured to determine strip material characteristics. For example, the user interface 602 may be implemented using a mechanical and/or graphical user interface via which an operator can input the strip material characteristics. The material characteristics can include, for example, a thickness of the strip material 100, the type of material (e.g., aluminum, steel, etc.), yield strength data, etc. In some examples, the storage interface 614 can retrieve a plunge depth value from a look-up table or data structure having start-up plunge depth settings for different material types based on, for example, material thickness values and/or yield strength values received by the user interface 602. Additionally or alternatively, an operator can manually select the plunge depth of the work rolls 212 by entering a plunge depth valve via the user interface 602. In other examples, an operator or other user can manually set the initial plunge depth of the work rolls 212. The user interface 602 may be configured to communicate the strip material characteristics to the controller 604 and/or the plunge position adjustor 608.

The plunge position adjustor 608 may be configured to obtain strip material characteristics from the user interface 602 to set the plunge or vertical positions of the work rolls 212 (e.g., the distance between the upper and lower work rolls 302 and 304 of FIG. 3). In some examples, the plunge position adjustor 608 may retrieve predetermined plunge position values from the storage interface 614 and determine the plunge position of the work rolls 212 based on the strip material input characteristics from the user interface 602.

More specifically, the controller 604 may cause the plunge position adjustor 606 to automatically adjust the entry and exit work rolls 306 and 308 to predetermined entry and exit work roll plunge depths corresponding to the particular strip material data provided by the user via the user input interface 602. For example, the controller 604 and/or plunge position adjustor 608 can determine the plunge depth of the entry work rolls 306 and/or the exit work rolls 308 required to condition or process the strip material 100 based on the strip material characteristics. For example, the entry work rolls 306 may be adjusted to provide a plunge depth that is deeper (e.g., greater) than the plunge depth of the exit work rolls 308.

To adjust the plunge depth of the work rolls 212, the plunge position adjustor 608 causes the actuators 418 and 420 (FIG. 4) to adjust the plunge depth positions of the entry work rolls 306 and/or the exit work rolls 308. For example, the controller 604 may command the plunge position adjustor 606 to supply or deliver a pressurized control fluid to the actuators 418 and 420 sufficient to position the adjustable flights 416 and, thus, the backup bearings 414 relative to the upper work rolls 302 to provide desired plunge depths.

The plunge position detector 608 may be configured to sense or detect the plunge depth position values of the work rolls 212. For example, the plunge position detector 606 can detect the vertical position or distance between the work rolls 212 (i.e., the upper and lower work rolls 302 and 304) to achieve a particular plunge depth position. To detect the position of the plunge depth, the plunge position detector 606 receives a position signal value via, for example, position sensors associated with the actuators 418, 420. The plunge position detector 606 can then communicate the plunge depth position value to the controller 604 and/or the comparator 612.

Additionally, the sensor interface 610 may be configured to communicate with the sensors 516, 518. More specifically, the sensor interface 610 may be configured to receive values representative of the measured distances 536, 538 between the base 540 and the upper surface 524 of the strip material 100 provided by the respective sensors 516, 518. The sensor interface 610 may be configured to communicate the measured values to the comparator 612, the controller 604 and/or the plunge position adjustor 608. In some examples, the sensor interface 610 may be configured to determine or calculate the difference value between the measured value representative of the height or distance 536 provided by the first sensor 516 and the measured value representative of the height or distance 538 provided by the second sensor 518. In some examples, the comparator 612 and/or the controller 604 may be configured to obtain the measured distance values corresponding to the distances 536, 538 from the sensor interface 610 and may be configured to determine the difference value by comparing the measured distance values obtained from the sensor interface 610. For example, the sensor interface 610, the comparator 612 and/or the controller 604 may be configured to perform comparisons, calculate or otherwise obtain a difference or differential value between the first and second measured values. Based on the comparisons, the sensor interface 610, the comparator 612 and/or the controller 604 can determine if the differential value deviates from a threshold or reference (e.g., a near zero value, etc.). The sensor interface 610, the comparator 612 and/or the controller 604 may then communicate the results of the comparisons to the plunge position adjustor 606 to adjust a plunge depth of the work rolls 212.

The calibrator 616 may be configured to calibrate or determine and/or record the calibrated reference value (e.g., an initial value or reference value indicative of the strip material 100 having a desired flatness characteristic) of the first and second sensors 516, 518. For example, the calibrator 616 may be configured to initiate when a user input command is selected via the user input interface 602. For example, during a pre-production or test run, the calibrator 616 may be configured to calibrate a reference value based on the strip material 100 having substantially flat characteristics. For example, after a visual inspection determines that the strip material 100 is substantially flat, the calibrator 616 may be initiated or configured to record or set the reference value (e.g., a predetermined reference value) at a distance that corresponds to the distances 536, 538 of the respective sensors 516, 518. The calibrator 616 may be configured to communicate this initial position or calibrated reference value to the comparator 612, the sensor interface 610 and/or the controller 604. In some examples, the calibrator 616 may be configured to communicate the calibrated reference value with the storage interface 614, the comparator 612, the controller 604 and/or the sensor interface 610.

In some examples, the calibrator 616 may initiate a calibration of the sensors 516, 518 prior to processing the strip material 100 through the leveler 202. Additionally or alternatively, the calibrator 616 may be configured to automatically initiate calibration of the sensors 516, 518 prior to beginning a production run.

In some examples, calibration plates having a known thickness may be positioned between the upper and lower work rolls 302 and 304 and the calibrator 616 may be configured to instruct the plunge position adjustor 606 to move the lower work rolls 304 toward the upper work rolls 302 until the upper and lower work rolls 302 and 304 engage or close against opposing surfaces of the calibration plates. For example, an operator may position the calibration plates between the upper and lower work rolls 302 and 304. Once the work rolls are in the closed position, the calibrator 616 can set the distance value 536, 538 as the reference value(s) (e.g., a base value).

Figure 8:
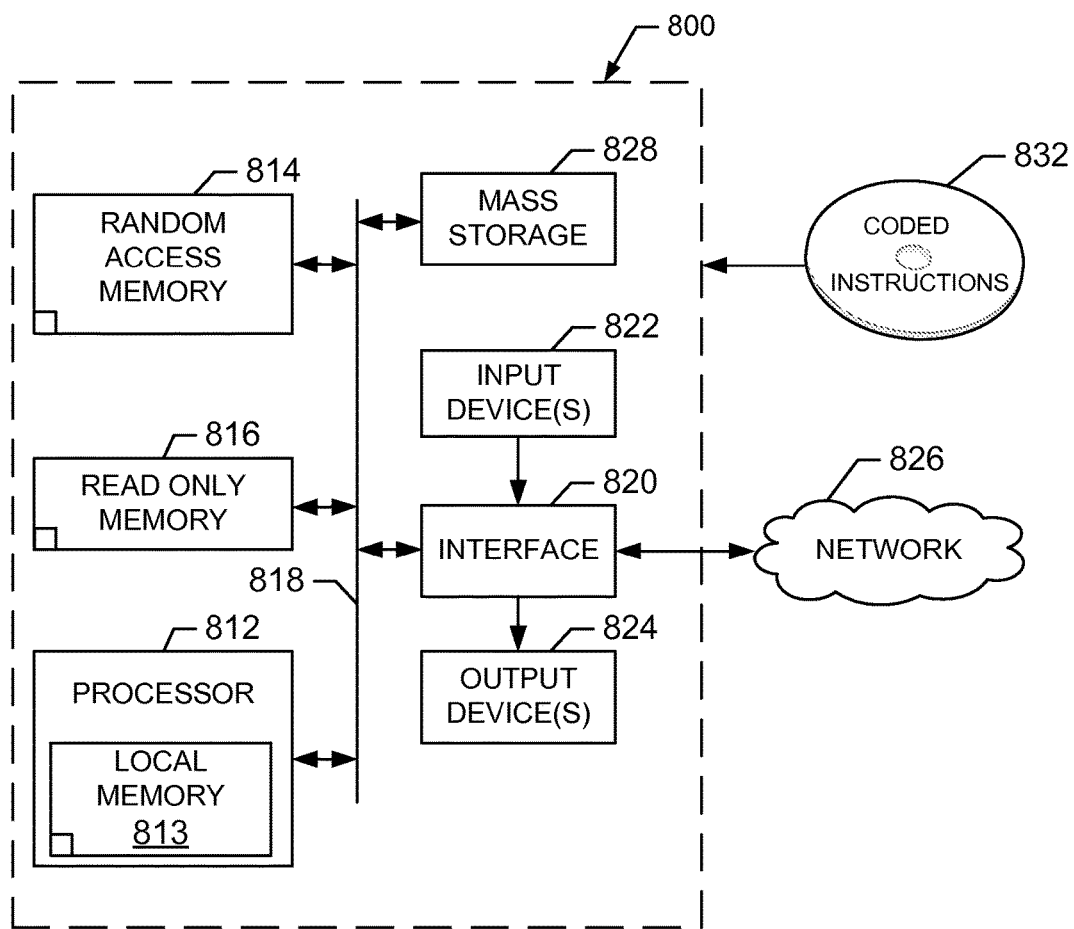
FIG. 8 is a block diagram of an example processor platform that may be used to implement the example methods and apparatus described herein.

The storage interface 614 may be configured to store data values in a memory such as, for example, the system memory 813 and/or the mass storage memory 828 of FIG. 8. Additionally, the storage interface 614 may be configured to retrieve data values from the memory (e.g., a plunge depth position structure and/or a plunge depth pressure structure). For example, the storage interface 614 may access a data structure to obtain plunge position values from the memory and communicate the values to the plunge position adjustor 606. The storage interface 614 may be configured to store the reference value provided by the sensor interface 610 and/or the calibrator 616.

Figure 7:
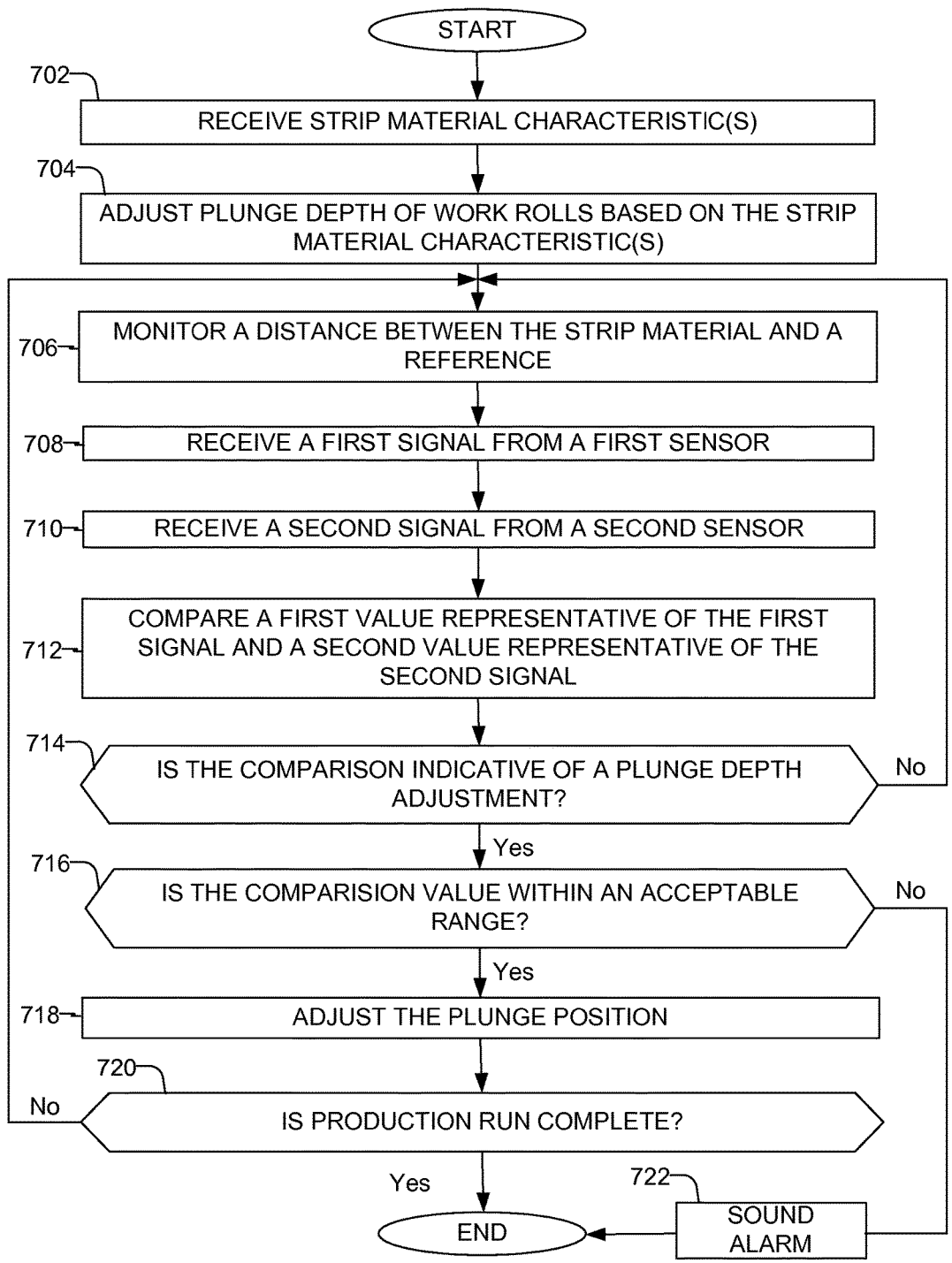
FIG. 7 illustrates a flow diagram of an example method to implement the example system of FIG. 6.

FIG. 7 illustrates a flow diagram of an example method 700 that may be used to implement the example system 600 of FIG. 6. In some example implementations, the example method 700 of FIG. 7 may be implemented using machine readable instructions comprising a program for execution by a processor (e.g., the processor 812 of the example processor system 800 of FIG. 8). For example, the machine readable instructions may be executed by the controller 604 (FIG. 6). The program may be embodied in software stored on a tangible medium such as a CD-ROM, a floppy disk, a hard drive, a digital versatile disk (DVD), or a memory associated with the processor 812 and/or embodied in firmware and/or dedicated hardware. Although the example programs are described with reference to the flow diagram illustrated in FIG. 7, persons of ordinary skill in the art will readily appreciate that many other methods of implementing the example lever 202 may alternatively be used. For example, the order of execution of the blocks may be changed, and/or some of the blocks described may be changed, eliminated, or combined.

For purposes of discussion, the example method 700 of FIG. 7 is described in connection with the example leveler 202 of FIGS. 2A, 2B, and 3-5 and the example apparatus 600 of FIG. 6. In this manner, each of the example operations of the example method 700 of FIG. 7 is an example manner of implementing a corresponding one or more operations performed by one or more of the blocks of the example apparatus 600 of FIG. 6.

Turning in detail to FIG. 7, the system 700 receives strip material characteristics information (block 702). For example, a user can input the material characteristics via a user interface such as, for example, the user interface 602 of FIG. 6.

The plunge depth of the work rolls 212 is adjusted based on the strip material characteristics (block 704). For example, the plunge position adjustor 606 delivers pressurized control fluid to the respective actuators 418 and 420. More specifically, as noted above, the plunge position adjustor 606 adjusts the plunge position of the work rolls 212 at the entry 426 of the leveler 202 (e.g., the entry work rolls 306) and the plunge position of the work rolls 212 at the exit 428 of the leveler 202 (e.g., the exit work rolls 308). After the plunge depth is set, the strip material 100 is processed via the leveler 202.

In operation, variations in the forces may be required to plunge the strip material 100 beyond its yield strength due to, for example, the effects of coil set or longbow. As the strip material is fed through the leveler 202, the sensor module 610 monitors a distance (e.g., a vertical distance) between the strip material 100 and a base or reference location (block 706). For example, the sensor interface 610 monitors and/or reads one or more distance values corresponding to the distances 536, 538 as the strip material 100 is processed by the leveler 202. For example, the base or reference value may be the calibrated reference value determined during calibration of the sensors 516, 518 by measuring the distances 536, 538 when the strip material 100 has a known flatness characteristic determined via, for example, visual inspection of a sheared portion of the strip material 100.

As the strip material 100 exits the leveler 202, a first sensor provides a first signal (block 708). For example, the first signal is representative of a measured value corresponding to the distance 536 between the base 540 of the first sensor 516 and the upper surface 524 of the strip material 100. The first signal or value measured by the first sensor 516 may be communicated to the sensor interface 610, the comparator 612 and/or the controller 604.

A second sensor also provides a second signal (block 710). For example, the second signal is representative of a measured value corresponding to the distance 538 between the base 540 of the second sensor 518 and the upper surface 524 of the strip material 100. For example, the second signal or value measured by the second sensor 518 may be communicated to the sensor interface 610, the comparator 612 and/or the controller 604. In some examples, the first and second signals are provided simultaneously to the sensor interface 610, the comparator 612 and/or the controller 604.

To detect material curvature, the comparator 612, the sensor interface 610 and/or the controller 604 compares the first value representative of the first signal and a second value representative of the second signal (block 712). For example, the first value of the first signal is compared with the second value of the second signal to determine or calculate a difference between the first and second values. For example, the comparator 612, the sensor interface 610 and/or the controller 604 may be configured to determine or calculate the difference between the first and second measured values provided by the first and second signals (e.g., the sensors 516, 518).

The comparator 612, the sensor interface 610 and/or the controller 604 then determines if the comparison between the first and second measured values is indicative of a plunge depth adjustment (block 714). For example, the comparator 612, the sensor interface 610 and/or the controller 604 determines if the difference between the first and second measured values is substantially equal to a threshold value such as, for example, a zero value or a near zero value. If the calculated difference is equal to the threshold value, then the method 700 returns to block 706. In some examples, the threshold value may have an error or buffer (e.g., a value or range). For example, the error or buffer may be the threshold value plus or minus a value such as, for example, 0.001. Thus, a calculated difference that falls within the error or buffer range would result in the calculated difference being equal to the threshold value.

If the calculated difference deviates from the threshold value, the comparator 612, the sensor interface 610 and/or the controller 604 determines if the comparison value (e.g., the calculated difference value) is within an acceptable range (block 716). For example, the comparison value may deviate from the threshold value if the calculated difference value is greater than or less than the threshold value (e.g., near zero).

If the difference is within the acceptable range, then the plunge depth position of the work rolls is adjusted (block 718). For example, the comparator 612, the sensor interface 610 and/or the controller 604 determines a necessary plunge depth adjustment value and causes the plunge position adjustor 606 to adjust (e.g., increase or decrease) a plunge depth of the work rolls 212. For example, the plunge position adjustor 606 adjusts the plunge depth based on the value provided by the calculated difference between the first and second distance values. For example, a difference value of approximately 0.005 inches may cause the plunge position adjustor 606 to adjust the plunge of one or more of the work rolls 212 by 0.001 inches. Further, depending on the difference value having a positive or negative value, the adjustment may be toward the closed position (e.g., the work rolls 212 move toward each other) or the open position (e.g., the work rolls 212 move away from each other).

The comparator 612, the sensor interface 610 and/or the controller 604 determines if the production run is complete (block 720). If the production is not complete at block 720, the method 700 returns to block 706. If the comparator 612, the sensor interface 610 and/or the controller 604 determines that the production run is complete at block 720, the method 700 ends.

If the difference value is outside of the acceptable range at block 714, then an alarm is initiated (block 722). The alarm, for example, alerts an operator to reset the production run. Additionally or alternatively, in some examples, when the alarm is initiated, the comparator 612, the sensor interface 610 and/or the controller 604 may also command the calibrator 616 to initiate (e.g., automatically) a calibration routine to calibrate the sensors 516, 518.

FIG. 8 is a block diagram of an example processor platform 800 capable of executing or processing the methods or instructions of FIG. 7 to implement the apparatus 600 of FIG. 6 and/or the leveler 202 of FIGS. 2A, 2B and 3-5. The processor platform 800 can be, for example, a server, a computer, a programmable logic circuit (PLC), and/or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a keyboard, a button, a touchscreen, a mobile device (e.g., a cell phone, a tablet such as an IPad™), a track-pad, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the method of FIG. 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture use distance difference values to determine if a sufficient force is applied to plastically deform or yield the strip material (e.g., the strip material 100) passing through nested work rolls (e.g., the work rolls 212) to remove longbow or material curvature (e.g., material concavity). More specifically, measured distances (e.g., vertical distances) can be used to determine if the force provided by the work rolls 212 is sufficient to plunge (e.g., stretch or bend) the strip material 100 beyond its yield strength to release internal stresses (e.g., remove coil set or longbow) in the strip material 100 to provide substantially flat strip material 100.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A system comprising:
a plurality of work rolls to process a continuous strip of material positioned between an entry and an exit of an apparatus;
a sensor positioned downstream from the exit of the apparatus, the sensor to measure a first distance between an upper surface of the strip material and a predetermined reference, the sensor to measure a second distance between the upper surface of the strip material and the predetermined reference, the first and second distances being measured at at least one of two different locations or two different instances in time as the strip material exits the apparatus; and
a controller to compare the first distance and the second distance to detect material curvature or longbow in the strip material.

2. The system of claim 1, wherein the controller is to determine a difference value between the first measured distance and the second measured distance and to compare the determined difference value to a threshold value, and wherein the controller detects the material curvature indicative or longbow along a longitudinal length of the strip material when the determined difference value deviates from the threshold value.

3. The system of claim 2, further comprising a plunge adjustor to adjust a plunge depth of the work rolls when the difference value deviates from a threshold value.

4. The system of claim 1, wherein the predetermined reference comprises a height between a base of the sensor and the upper surface of the strip material indicative of the strip material having a desired flatness characteristic substantially free of longbow.

5. The system of claim 1, wherein the predetermined reference comprises a calibrated height between the upper surface of the strip material and a base of the sensor determined when the strip material is free of longbow.

6. The system of claim 1, wherein the sensor comprises only one sensor.

7. The system of claim 1, wherein the sensor is mounted at a lateral distance from a central axis of a work roll adjacent the exit of the apparatus.

8. The system of claim 7, wherein the lateral distance is approximately between 6 inches and 24 inches from at least one of the central axis of the work roll or the exit of the apparatus.

9. The system of claim 1, wherein the sensor is aligned with a center longitudinal axis of the strip material, the center longitudinal axis being parallel to a direction of travel of the strip material between the entry and the exit.

10. The system of claim 1, wherein the sensor is coupled to a frame of the apparatus via a slider, the slider to enable independent adjustment of the sensor in a first direction relative to at least one of the frame or the strip material and a second direction non-parallel to the first direction.

11. A method to detect material curvature in a strip material, the method comprising:
processing a strip material via a plurality of work rolls positioned between an entry and an exit of an apparatus;
obtaining a first measured distance value between a predetermined reference and a first location on an upper surface of the strip material downstream from the exit of the apparatus as the strip material exits the work rolls;
obtaining a second measured distance value between the predetermined reference and a second location on the upper surface of the strip material downstream from the exit of the apparatus as the strip material exits the work rolls, the first location being different than the second location; and
comparing the first measured distance value and the second measured distance value to detect material curvature or longbow in the strip material.

12. The method of claim 11, wherein comparing the first and second measured distance values comprises calculating a difference between the first measured distance value and the second measured distance value.

13. The method of claim 12, wherein comparing the first and second measured distance values further comprises comparing the calculated difference between the first and second measured distance values to a threshold value.

14. The method of claim 13, wherein detecting material curvature or longbow comprises detecting material curvature indicative of longbow along a longitudinal axis of the strip material when the calculated difference deviates from the threshold value.

15. The method of claim 11, further comprising obtaining the first and second measured distance values via only one sensor.

16. The method of claim 15, further comprising determining the predetermined reference comprises measuring a distance between a base of the sensor and an upper surface of the strip material when the strip material has a desired flatness characteristic substantially free of longbow.

17. The method of claim 11, further comprising determining whether the difference value is a positive value or a negative value and increasing or decreasing a plunge value based on the difference value being positive or negative.

18. The method of claim 11, further comprising adjusting a plunge depth of the work rolls if the difference value deviates from a threshold value.

19. The method of claim 11, wherein obtaining the first measured distance value comprises measuring a first vertical distance, via a sensor, between the first location on the upper surface of the strip material and a base of the sensor and obtaining the second measured distance value comprises measuring a second vertical distance, via the sensor, between the second location on the upper surface of the strip material and the base of the sensor.

20. The method of claim 11, further comprising obtaining the first and second measured distance values at two different instants in time as the strip material exits the apparatus.

21. A machine accessible medium having instructions stored thereon that, when executed, cause a machine to at least:
process a strip material via a plurality of work rolls positioned between an entry and an exit of an apparatus;
obtain a first measured distance value between a predetermined reference and a first location on an upper surface of the strip material downstream from the exit of the apparatus as the strip material exits the work rolls;
obtain a second measured distance value between the predetermined reference and a second location on the upper surface of the strip material downstream from the exit of the apparatus as the strip material exits the work rolls, the first location being different than the second location; and
compare the first measured distance value and the second measured distance value to detect material curvature or longbow in the strip material.

22. The machine accessible medium as defined in claim 21 having instructions stored thereon that, when executed, cause the machine to calculate a difference between the first measured distance value and the second measured distance value.

23. The machine accessible medium as defined in claim 22 having instructions stored thereon that, when executed, cause the machine to compare the calculated difference between the first and second measured distance values to a threshold value.

24. The machine accessible medium as defined in claim 23 having instructions stored thereon that, when executed, cause the machine to detect material curvature indicative of longbow along a longitudinal axis of the strip material when the calculated difference deviates from the threshold value.

25. The machine accessible medium as defined in claim 21 having instructions stored thereon that, when executed, cause the machine to obtain the first and second measured distance values via only one sensor.

26. The machine accessible medium as defined in claim 25 having instructions stored thereon that, when executed, cause the machine to determine the predetermined reference by measuring a distance between a base of the sensor and an upper surface of the strip material when the strip material has a desired flatness characteristic substantially free of longbow.

27. The machine accessible medium as defined in claim 21 having instructions stored thereon that, when executed, cause the machine to determine whether the difference value is a positive value or a negative value and increasing or decreasing a plunge value based on the difference value being positive or negative.

28. The machine accessible medium as defined in claim 21 having instructions stored thereon that, when executed, cause the machine to adjust a plunge depth of the work rolls if the difference value deviates from a threshold value.

29. The machine accessible medium as defined in claim 21 having instructions stored thereon that, when executed, cause the machine to obtain the first measured distance value by measuring a first vertical distance, via a sensor, between the first location on the upper surface of the strip material and a base of the sensor and obtain the second measured distance value by measuring a second vertical distance, via the sensor, between the second location on the upper surface of the strip material and the base of the sensor.

30. The machine accessible medium as defined in claim 21 having instructions stored thereon that, when executed, cause the machine to obtain the first and second measured distance value at two different instants in time as the strip material exits the apparatus.

\* \* \* \* \*